(12) United States Patent
Chraibi et al.

(10) Patent No.: US 10,834,797 B2
(45) Date of Patent: Nov. 10, 2020

(54) CONTROLLER FOR CONTROLLING PLURALITY OF LIGHT SOURCES

(71) Applicant: SIGNIFY HOLDING B.V., Eindhoven (NL)

(72) Inventors: Sanae Chraibi, Eindhoven (NL); Berent Willem Meerbeek, Eindhoven (NL); Jonathan David Mason, Eindhoven (NL); Bartel Marinus Van De Sluis, Eindhoven (NL); Dzmitry Viktorovich Aliakseyeu, Eindhoven (NL); Anthonie Hendrik Bergman, Eindhoven (NL); Jochen Renaat Van Gheluwe, Eindhoven (NL); Dirk Valentinus Rene Engelen, Eindhoven (NL)

(73) Assignee: SIGNIFY HOLDING B.V.

( * ) Notice: Subject to any disclaimer, the term of this patent is extended or adjusted under 35 U.S.C. 154(b) by 0 days.

(21) Appl. No.: 16/481,694

(22) PCT Filed: Dec. 22, 2017

(86) PCT No.: PCT/EP2017/084336
§ 371 (c)(1),
(2) Date: Jul. 29, 2019

(87) PCT Pub. No.: WO2018/137872
PCT Pub. Date: Aug. 2, 2018

(65) Prior Publication Data
US 2019/0394857 A1     Dec. 26, 2019

(30) Foreign Application Priority Data

Jan. 30, 2017  (EP) .................................... 17153754

(51) Int. Cl.
*G10L 15/22* (2006.01)
*H05B 47/10* (2020.01)
(Continued)

(52) U.S. Cl.
CPC .............. *H05B 47/12* (2020.01); *G10L 15/22* (2013.01); *H04R 1/406* (2013.01); *H04R 3/005* (2013.01); *G10L 2015/223* (2013.01)

(58) Field of Classification Search
CPC ................ H05B 37/0236; G10L 15/22; G10L 2015/223; G10L 2021/02166;
(Continued)

(56) References Cited

U.S. PATENT DOCUMENTS 6,219,645 B1 * 4/2001 Byers ..................... G10L 15/02
                                                                    381/91
2013/0088168 A1    4/2013 Mohan et al.
(Continued)

FOREIGN PATENT DOCUMENTS

| CN | 202649819 U | 1/2013 |
|---|---|---|
| EP | 0653701 A1 | 5/1995 |
| JP | 2006148357 A | 6/2006 |

OTHER PUBLICATIONS

"Homebridge Einrichten", Aus FHEMWiki, webpage: https://web.archive.org/web/20170107312910/https://wiki.fhem.de/wiki/Homebridge_einrichten, downloaded Mar. 3, 2018, pp. 1-16.
(Continued)

*Primary Examiner* — Henry Luong
(74) *Attorney, Agent, or Firm* — Akarsh P. Belagodu (57) ABSTRACT

A controller 102, 202 for controlling a plurality of light sources is disclosed. The controller 102, 202 comprises a receiver 106, 206 configured to receive a sound input from a plurality of microphones, the sound input being a user input from a user, a localization module 108, 208 configured (Continued)

to determine a user location of the user relative to the plurality of microphones based on differences between the sound input received at different microphones of the plurality of microphones, and a processor 110, 210 configured to receive location information indicative of locations of the plurality of light sources, determine which one or more light sources of the plurality of light sources are associated with the user location based on the location information, and control the one or more light sources based on the sound input.

15 Claims, 5 Drawing Sheets

(51) Int. Cl.
*H05B 47/12* (2020.01)
*H04R 1/40* (2006.01)
*H04R 3/00* (2006.01)

(58) Field of Classification Search
CPC .... H04R 1/406; H04R 3/005; H04R 2430/20; H04R 2430/21; H04R 2430/23
See application file for complete search history.

(56) References Cited

U.S. PATENT DOCUMENTS

| | | |
|---|---|---|
| 2013/0088359 A1 | 4/2013 | Monaci et al. |
| 2016/0029458 A1 | 1/2016 | Liu et al. |
| 2017/0109983 A1* | 4/2017 | Flint .................. H04M 1/0291 |
| 2019/0092189 A1* | 3/2019 | Moenkemueller ..... B60N 2/002 |

OTHER PUBLICATIONS

Mrunal Dipakkumar Bhatt, Intelligent Voice Activated Home Automation (IVA); Bachelor of Engineering in Information Technology, University of Pune, May 2010, pp. 1-104.

* cited by examiner

CONTROLLER FOR CONTROLLING PLURALITY OF LIGHT SOURCES

CROSS-REFERENCE TO PRIOR APPLICATIONS

This application is the U.S. National Phase application under 35 U.S.C. § 371 of International Application No. PCT/EP2017/084336, filed on Dec. 22, 2017, which claims the benefit of European Patent Application No. 17153754.1, filed on Jan. 30, 2017. These applications are hereby incorporated by reference herein.

FIELD OF THE INVENTION

The invention relates to a controller for controlling a plurality of light sources. The invention further relates to a system for controlling a plurality of light sources. The invention further relates to a method for controlling a plurality of light sources and to a computer program product for executing the method.

BACKGROUND

Current and future home environments will comprise multiple lighting devices which can be controlled via connected devices. An example of such a connected device is a smartphone which communicates wirelessly with the lighting devices via, for example, Bluetooth, Wi-Fi or ZigBee. The smartphone enables a user to control lighting devices in his or her house by providing voice commands. Another example of a connected device for controlling lighting devices based on voice commands is a smart speaker that comprises a plurality of microphones. These devices enable a user to control the lighting simply by providing voice commands such as "turn on lights in [room name]", "Set lights to [X %] brightness" or "set scene [light scene name]". A problem that occurs with these devices is that if the spoken lighting control command is unclear or incomplete, the smartphone or smart speaker may not be able to (correctly) retrieve the voice command and therefore control the lighting incorrectly.

SUMMARY OF THE INVENTION

It is an object of the present invention to provide a more accurate voice controlled lighting system.

According to a first aspect of the present invention, the object is achieved by a controller for controlling a plurality of light sources, the controller comprising:

a receiver configured to receive a sound input from a plurality of microphones, the sound input being a user input from a user, a localization module configured to determine a user location of the user relative to the plurality of microphones based on differences between the sound input received at different microphones of the plurality of microphones, and a processor configured to receive location information indicative of locations of the plurality of light sources, determine which one or more light sources of the plurality of light sources are associated with the user location based on the location information, and control the one or more light sources based on the sound input.

The controller is configured to determine the location of the user relative to the light sources, and to control one or more light sources that are associated with the user location based on the sound input. The sound input may, for example, be a voice command comprising control instructions for controlling the light sources. This is beneficial, because it removes the need for a user to indicate the location where he or she wishes to control the light. Instead of the control command "turn on lights in [room name]" he or she can simply provide the control command "turn on lights", whereupon the light sources associated with the user location are controlled according to the sound input.

In embodiments, the plurality of light sources are distributed over a plurality of areas, and the location information is indicative of in which areas the plurality of light sources are located. The localization module is configured to determine a user area wherein the user is located based on the user location, and the processor is configured to determine which one or more light sources are located in the user area, and to control one or more light sources located in the user area based on the sound input. The areas may be defined by (sets of) coordinates (e.g. X-Y coordinates). Thus, when a user is located at a border of a user area and light sources of another area are in closer proximity of the user, all light sources in the user area are controlled instead of the light sources in closest proximity to the user. Examples of areas include but are not limited to rooms (e.g. kitchen, living room, bathroom), parts of rooms (e.g. north side and south side of a living room), user-defined areas (e.g. a user may have created an area and he may have assigned lighting devices to this area), etc.

In embodiments, the sound input is a voice command and each of the plurality of light sources is associated with an area description descriptive of an area of the plurality of areas. This embodiment is beneficial, because it further enables a user to provide a voice command comprising instructions for controlling the light in an area. An area description may, for example, be "kitchen", "living room", "hallway", etc.

In embodiments, the voice command comprises a target area description of a target area of the plurality of areas. The processor is further configured to retrieve the target area description from the voice command and to determine which group of one or more light sources has an area description corresponding to the target area description and to control the group of one or more light sources based on the sound input. This enables a user to control light sources in a target area different from the user area where he or she is currently located. This may be beneficial, for example, when a user is lying in bed and he or she wishes to turn off the light in the living room.

In embodiments, the processor is configured to control, when the processor is unable to retrieve the target area description from the voice command or when the processor has determined that no area description corresponds to the target area description, one or more light sources located in the user area. If the processor fails to recognize/retrieve the target area from the voice command, the one or more light sources located in the user area are controlled according to the sound input. This is beneficial, because it is highly likely that a user wishes to control light sources in an area where he or she is located.

In embodiments, the processor is further configured to activate and deactivate a learning mode of the controller, wherein, when the controller is set to the learning mode, the processor is configured to generate the location information by: retrieving a user area description descriptive of the user area from the voice command, determining if a set of one or more light sources is located in the user area by comparing the user area description with area descriptions of the plurality of light sources, and, if the set of one or more light sources is located in the user area, determining light source locations of the one or more light sources of the set of one or more light sources based on the user location. The area descriptions of the light sources may already be stored in a memory in a lighting control device (e.g. a smartphone, a bridge, a home control system, the controller etc.) and the processor may have access to these area descriptions. By comparing the user area description (e.g. "kitchen") from the voice command with the area descriptions of the light sources (e.g. 2 light sources may have a "kitchen" description), the processor is able to determine which light sources are located nearby the user (assumed that the user is located in the kitchen). After this determination, the processor determines light source locations of the one or more light sources of the set of one or more light sources based on the user location. The processor may further store, in a memory, the light source locations of the one or more light sources of the set of one or more light sources based on the user location. This is beneficial, because this enables a user, when the controller is no longer set to the learning mode, to control the set of light sources without requiring the area description. For example, the user can simply provide a voice command "turn lights off" when he or she is in the kitchen, without requiring to indicate the area.

Alternatively, the processor is further configured to activate and deactivate a learning mode of the controller, wherein, when the controller is set to the learning mode, the processor is configured to generate the location information by: retrieving a light source description from the voice command, the light source description being descriptive of an identifier of the light source, identifying the light source based on the identifier, determining the location of the light source based on the user location, and repeating the previous steps for other light sources of the plurality of light sources. This enables a user to commission/configure the light sources by providing the light source description at the location of the light source. The light source description is descriptive of an identifier of a respective light source. The light source descriptions may already be stored in a memory in a lighting control device (e.g. a smartphone, a bridge, a home control system, the controller etc.) and the processor may have access to these area descriptions. A user may, for example, stand nearby a light source (having light source description "kitchen lamp 1") and provide a voice command "this is kitchen lamp 1", whereupon the localization module may determine the user location based on differences between the voice command received at different microphones of the plurality of microphones. After determining the user location and identifying the light source based on the identifier, the processor determines the location of the light source based on the user location. The processor may further store the light source location in a memory. This is beneficial, because this enables a user, when the controller is no longer set to the learning mode, to control the set of light sources without requiring the area description. For example, the user can simply provide a voice command "turn lights off" when he or she is in the kitchen, without requiring to indicate the area.

In embodiments, the processor is configured to identify the user based on the sound input, and to control the one or more light sources further based on a user profile associated with the identified user. The processor may use voice recognition to identify the user, and/or the user may provide a voice command providing a user identifier (e.g. "this is [name of user]"). The processor may be configured to access a database storing the user profile. The user profile may comprise user preferences (e.g. favorite light settings), and the processor may determine how to control the light output of the one or more light sources based on these preferences. This is beneficial, because the light output of the one or more light sources is controlled based on the preference of the user who provides the sound input.

In embodiments, the localization module is configured to determine the location of the user based on differences in signal strength of the sound input received at different microphones of the plurality of microphones. The localization module may compare the differences in signal strength (e.g. by comparing spectrograms and/or dB levels of different microphones) to determine, for example by triangulation or trilateration, the user location of the user.

Additionally or alternatively, the localization module is configured to determine the location of the user based on differences in time between receiving the sound input at different microphones of the plurality of microphones. By detecting differences in time of arrival of the sound input at different microphones, the localization module is able to determine the user location of the user by applying triangulation or trilateration.

In embodiments, the processor is, when more than one light source is associated with the user location, configured to control the more than one light sources further based on a distance between a respective light source and the user. The processor or the localization module is configured to determine distances between the user and the light sources based on differences between the sound input received at different microphones of the plurality of microphones, whereupon the processor may control the more than one light sources according to different settings based on their distance from the user. The processor may, for example, dim light sources farther away from the user less than light sources closer to the user. This is beneficial, for example when light scenes/light effects do not have an evenly distributed illumination.

In embodiments, the plurality of microphones are comprised in the controller. Alternatively, the plurality of microphones are distributed throughout the space. The microphones may, for example, be comprised in the plurality of light sources. For instance, multiple light sources in an area could each be equipped with a single microphone which are connected to the controller, such that the controller can compare audio signals to determine the location of the sound input, and therewith the user location of the user. Alternatively, an area may have an advanced luminaire comprising a variety of microphones. Optionally, the controller may be part of this advanced luminaire.

In embodiments wherein the plurality of microphones are comprised in the controller, the controller may comprise an orientation and/or a location sensor, and the processor may be configured to determine the locations of the plurality of light sources relative to the controller based on an orientation signal received from the orientation sensor and/or a location signal received from the location sensor. Thus, when a user moves and/or rotates the controller, the processor takes these movements/rotations into account, such that the locations of the light sources (and the user location(s)) can still be determined relative to the controller, and the correct light sources will be controlled based on the sound input provided by the user. This is beneficial, because it enables the user to reposition the controller.

Additionally, in embodiments wherein at least some of the plurality of microphones are directed in different directions, the localization module is configured to determine the user location of the user relative to microphones (and therewith relative to the controller) further based on the directions of the plurality of microphones. When the microphones are directed in different directions, their directionality may be of influence on how strong a received sound input is (or be of influence of the time of arrival of the sound input). Therefore, it is beneficial if the localization module takes the directions of the microphones into account when determining the user location of the user relative to the controller.

In embodiments, the sound input is indicative of a light setting, and the processor is configured to control the one or more light sources based on the light setting. The sound command may, for example, be a voice command comprising lighting control instructions to control the light according to a specific color, intensity (dim level) and/or saturation. The voice command may comprise instructions for activating a light scene (a predefined light setting comprising lighting control commands for a plurality of light sources) or a dynamic light scene wherein the color, intensity and/or saturation change over time.

According to a second aspect of the present invention, the object is achieved by a system for controlling a plurality of light sources, the system comprising: the controller of any one of the above-mentioned embodiments, a plurality of microphones configured to receive a sound input from a user, and configured to communicate the sound input to the controller, and the plurality of light sources, each arranged for receiving a control signal from the controller.

According to a third aspect of the present invention, the object is achieved by a method of controlling a plurality of light sources, the method comprising:
receiving a sound input from a plurality of microphones, the sound input being a user input from a user,
determining a user location of the user relative to the plurality of microphones based on differences between the sound input received at different microphones of a plurality of microphones,
receiving location information indicative of locations of the plurality of light sources relative to the controller,
determining which one or more light sources of the plurality of light sources are associated with the user location based on the location information, and
controlling the one or more light sources based on the sound input.

It should be understood that the method may have similar and/or identical embodiments and advantages as the claimed device.

According to a fourth aspect of the present invention, the object is achieved by a computer program product for a computing device, the computer program product comprising computer program code to perform any one of the above-mentioned methods when the computer program product is run on a processing unit of the computing device.

BRIEF DESCRIPTION OF THE DRAWINGS

The above, as well as additional objects, features and advantages of the disclosed controllers and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
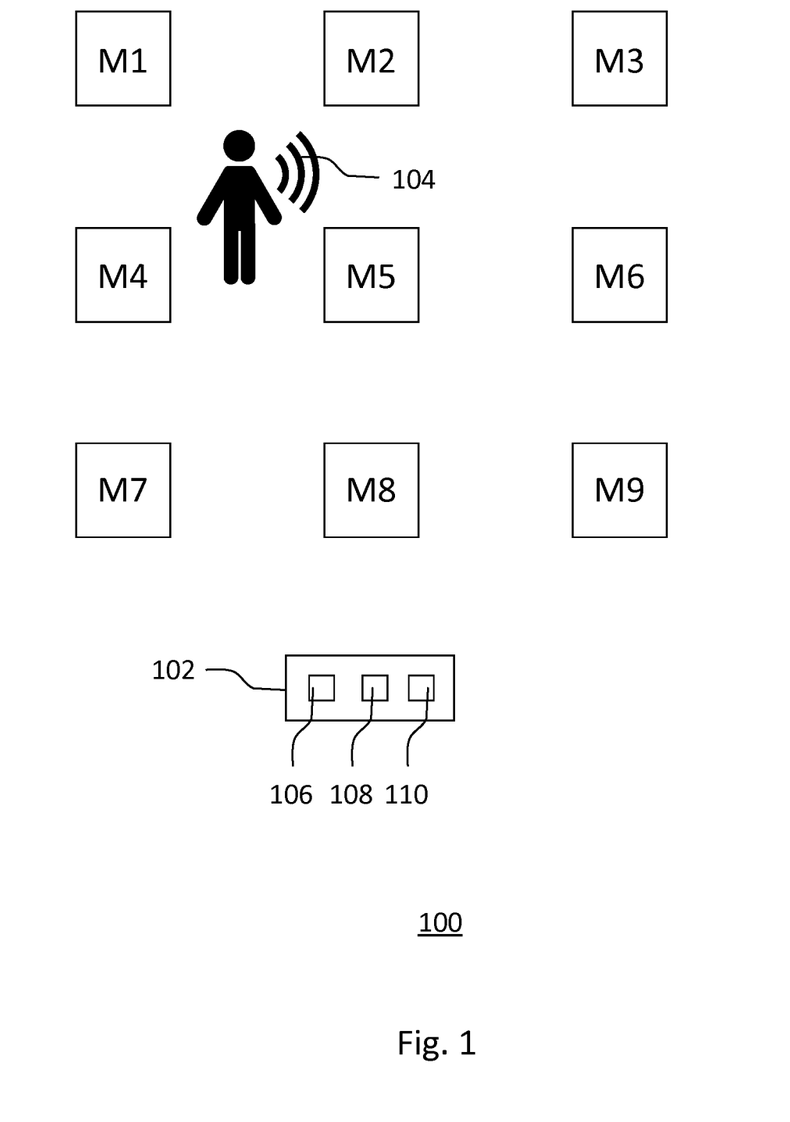
FIG. 1 shows schematically an embodiment of a top view of a system according to the invention for controlling a plurality of light sources, wherein a plurality of microphones are distributed throughout a space.
Figure 2:
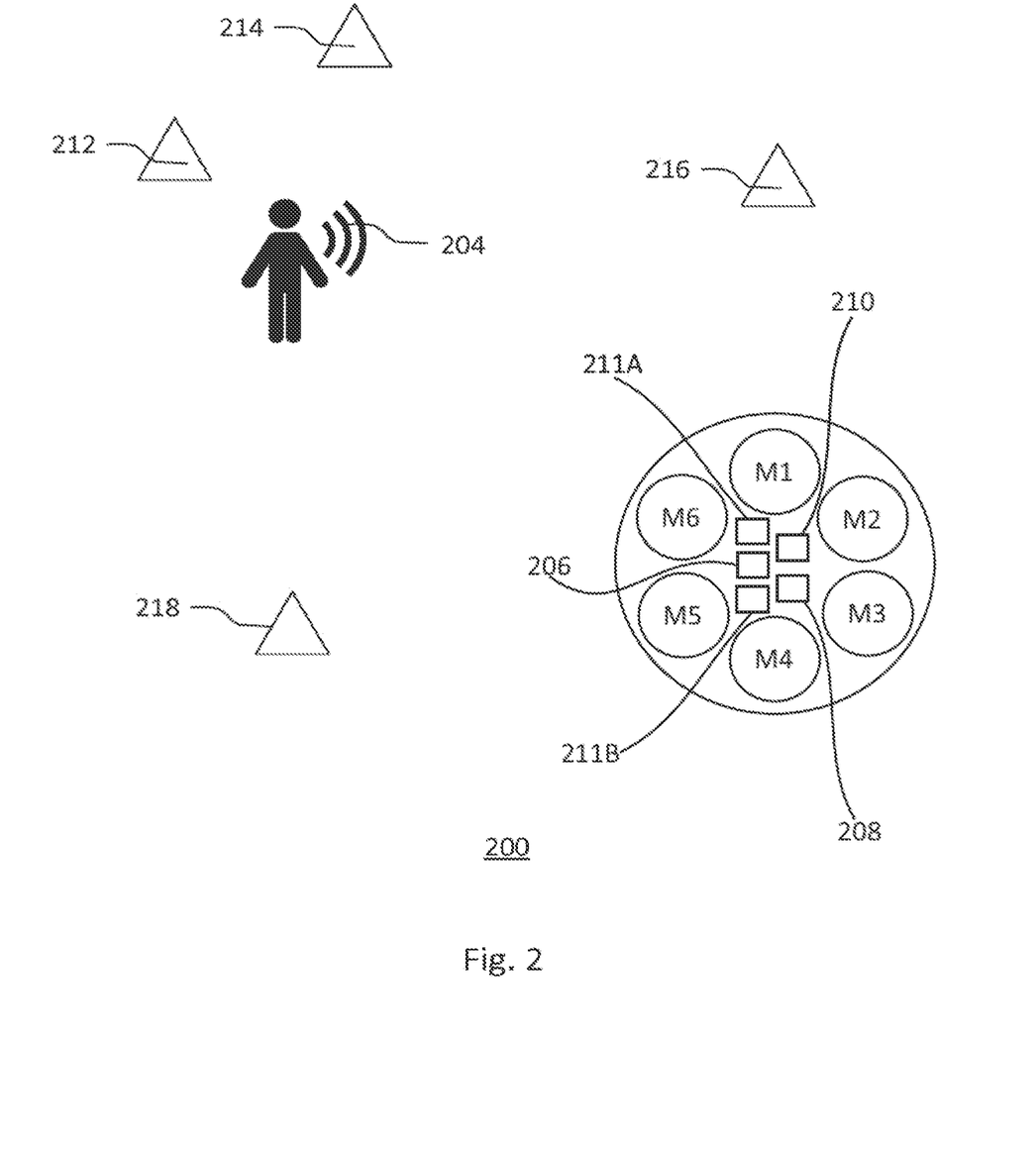
FIG. 2 shows schematically an embodiment of a top view of a system according to the invention for controlling a plurality of light sources, wherein a plurality of microphones are comprised in a controller.

FIGS. 1 and 2 show schematically embodiments of systems 100, 200 according to the invention for controlling a plurality of light sources. The systems 100, 200 comprise a plurality of light sources, a plurality of microphones and a controller 102, 202. The controller 102, 202 comprises a receiver 106, 206 configured to receive a sound input 104, 204 from a plurality of microphones, the sound input 104, 204 being a user input from a user. The controller 102, 202 further comprises a localization module 108, 208 configured to determine a user location of the user relative to the plurality of microphones based on differences between the sound input 104, 204 received at different microphones of the plurality of microphones. The controller 102, 202 also comprises a processor 110, 210 configured to receive location information indicative of locations of the plurality of light sources. The processor 110, 210 is further configured to determine which one or more light sources of the plurality of light sources are associated with the user location based on the location information, and to control the one or more light sources based on the sound input 104, 204.

The receiver 106, 206 is configured to receive a sound input 104, 204 from a plurality of microphones, the sound input 104, 204 being a user input from a user. In an embodiment wherein the plurality of microphones are distributed throughout a space, the receiver 106, 206 may be connected to the plurality of microphones via a (wireless) network. The receiver 106, 206 may comprise hardware for receiving the sound input 104, 204 via any wired or wireless communication protocol. Various wired and wireless communication protocols may be used, for example Ethernet, DMX, DALI, USB, Bluetooth, Wi-Fi, Li-Fi, 3G, 4G or ZigBee. In an embodiment wherein the plurality of microphones are comprised in the controller, the receiver 106, 206 may be directly coupled to the plurality of microphones. The receiver 106, 206 is further communicatively coupled to the localization module 108, 208.

The localization module 108, 208 may a separate processor such as a microcontroller. Alternatively, the localization module 108, 208 may be a software program running on the processor 110, 210. The localization module 108, 208 is configured to determine a user location (e.g. user coordinates) of the user relative to the plurality of microphones based on differences between the sound input 104, 204 received at different microphones of the plurality of microphones. The localization module 108, 208 may have access to a memory storing the locations of the plurality of microphones (e.g. microphone coordinates) relative to each other (and/or relative to the controller 102, 202, and/or relative to the environment), which enables the localization module 108, 208 to determine the user location of the user relative to the plurality of microphones (and, optionally, relative to the controller 102, 202 and/or relative to the environment).

The localization module 108, 208 may be configured to determine the user location based on differences in signal strength of the sound input 104, 204 received at different microphones of the plurality of microphones. The localization module 108, 208 may compare the differences in signal strength (e.g. by comparing spectrograms and/or dB levels of different microphones) to determine, for example by triangulation or trilateration, the user location of the user. Additionally or alternatively, the localization module 108, 208 may be configured to determine the location of the user based on differences in time between receiving the sound input 104, 204 at different microphones of the plurality of microphones. By comparing differences in time of arrival of the sound input 104, 204 at different microphones, the localization module 108, 208 may determine, for example by triangulation or trilateration, the user location of the user.

The processor 110, 210 (e.g. a microcontroller, circuitry, a microchip) is configured to receive location information indicative of locations of the plurality of light sources (e.g. light source coordinates relative to the environment). The location information may be received from the light sources directly, or it may be received from a further device such as a home control system, a remote server, a bridge device, etc. The processor 110, 210 is further configured to determine which one or more light sources of the plurality of light sources are associated with the user location based on the location information. The processor 110, 210 may be communicatively coupled or comprise a memory configured to store associations (e.g. a look-up table) between (each of) the plurality of light sources and user locations. The processor 110, 210 may access the memory in order to determine which one or more light sources of the plurality of light sources are associated with the user location. The memory may be comprised in a (remote) server, for example accessible via the internet.

The processor 110, 210 may, for example, receive light source coordinates indicative of the locations of the plurality of light sources, and compare user coordinates of a user location to the received light source coordinates in order to determine which of the plurality of light sources are located within a predetermined proximity of the user location. Additionally or alternatively, the processor 110, 210 may, for example, receive area descriptions descriptive of areas wherein the light sources are located (e.g. "kitchen" and "living room"). The area descriptions may be further associated with coordinates of the area (or, for example, with directions relative to the controller/plurality of microphones). The processor 110, 210 may determine user coordinates (or a user direction) based on the sound input, and determine in which user area he or she is located. The processor 110, 210 may then compare the user coordinates (or the user direction) with the coordinates (or directions relative to the associated controller/plurality of microphones) with the areas of the light sources, and control the light sources that are associated with the user area (i.e. the user location).

Additionally, the processor 110, 210 or the localization module 108, 208 may be configured to calculate a distance between the user and each of the light sources based on the user location (e.g. user coordinates) and the location information (e.g. light source coordinates). The processor may be further configured to control the more than one light sources further based on the distance between a respective light source and the user. For example, when a user provides a voice command "dim the lights", the processor 110, 210 may dim the most proximate light source(s) (i.e. closest to the user location) down with 50%, the light sources farther away down with 25% and the devices even farther away down with 5%.

The light sources are configured to receive control commands from the controller 102, 202. These control commands may for example comprise instructions for controlling the light source according to a light setting having a certain color, intensity and/or saturation. Additionally, the instructions may be indicative of dynamic light settings in which the color, intensity and/or saturation are changed over time. The light sources may be further connected to an (indoor) positioning system, which may determine the locations of the light sources and communicate the positions to the controller 102, 202. The plurality of light sources may be any type of lighting devices arranged for receiving lighting control commands from the processor 110, 210. The lighting devices may for example comprise LED light sources. The lighting devices may be arranged for providing general lighting, task lighting, ambient lighting, atmosphere lighting, accent lighting, indoor lighting, outdoor lighting, etc. The lighting devices may be installed in a luminaire or in a lighting fixture. Alternatively, the lighting devices may be portable lighting devices (e.g. a hand-sized device, such as an LED cube, an LED sphere, an object/animal shaped lighting device, etc.) configured to share their location information with the controller 102, 202. The processor 110, 210 may be communicatively coupled to the light sources, and be configured to communicate lighting control commands to the light sources in order to control them according to the sound input 104, 204. The controller 102, 202 may comprise hardware for transmitting the lighting control commands via any wired or wireless communication protocol. Various wired and wireless communication protocols may be used, for example Ethernet, DMX, DALI, USB, Bluetooth, Wi-Fi, Li-Fi, 3G, 4G or ZigBee. The receiver 106, 206 may be a transceiver configured to transmit and receive signals to and from the plurality of light sources.

The processor 110, 210 is further configured to control the one or more light sources based on the sound input 104, 204. The sound input 104, 204 may be a dedicated command for controlling the lighting, for example a voice command, a clapping sound, a whistle sound, a finger snapping sound, etc. Alternatively, the sound input 104, 204 may be a non-lighting command, for example: the sound of people talking in an area, the sound of footsteps, the sound of a door closing, etc.

The processor 110, 210 may be further configured to extract/retrieve a lighting control command from the sound input 104, 204. The sound input 104, 204 may, for example, be a voice command comprising a lighting control command such as "turn lights on/off". The processor 110, 210 may use speech recognition algorithms to retrieve the lighting control command from the sound input 104, 204 and control the one or more light sources associated with the user location according to the lighting control command by communicating the lighting control command to the one or more light sources.

The voice command may further comprise a target area description (e.g. "living room"), and the processor 110, 210 may control light sources that are located in this target area (e.g. the living room) based on the voice command (which may, for example, comprise "turn on lights in living room"), thereby overruling the regular control scheme wherein the processor 110, 210 is configured to control the light sources that are associated with the user location. If the processor 110, 210 is unable to retrieve the target area description from the voice command (for example when the user does not speak clearly) or when the processor has determined that no area description corresponds to the target area description (for example when the user only provides a light adjustment control command such as "turn lights off"), the processor 110, 210 may control the light sources according to the regular scheme, i.e. controlling the one or more light sources located in the user area based on the voice command.

The processor 110, 210 may be further configured to activate and deactivate a learning mode of the controller 102, 202. The learning mode may, for example, be activated when the controller is powered up for the first time, when a user input has been received on a device (e.g. a smartphone) connected to the controller, when a new lighting device/light source has been added to the lighting system, etc.

If the controller 102, 202 is set to the learning mode, the processor 110, 210 may be configured to generate the location information by: retrieving a user area description descriptive of the user area from the voice command, determining if a set of one or more light sources is located in the user area by comparing the user area description with area descriptions of the plurality of light sources, and, if the set of one or more light sources is located in the user area, determining light source locations of the one or more light sources of the set of one or more light sources based on the user location. The area descriptions of the light sources may already be stored in a memory in a lighting control device (e.g. a smartphone, a bridge, a home control system, the controller etc.) and the processor 110, 210 may have access to these area descriptions. By comparing the user area description (e.g. "kitchen") from the voice command with the area descriptions of the light sources (for example two light sources may be associated with a "kitchen" description), the processor 110, 210 may be able to determine which light sources are located nearby the user (assumed that the user is located in the kitchen). After this determination, the processor 110, 210 may determine light source locations of the one or more light sources of the set of one or more light sources based on the user location. The processor 110, 210 may further store the light source locations of the one or more light sources of the set of one or more light sources based on the user location in a memory. In other words, the processor 110, 210 may store a location of the set of light sources in the memory, which location of the set of light sources corresponds to the user location.

Alternatively, when the controller is set to the learning mode, the processor 110, 210 may be configured to generate the location information by: retrieving a light source description from the voice command, the light source description being descriptive of an identifier of the light source, identifying the light source based on the identifier, determining the location of the light source based on the user location, and repeating the previous steps for other light sources of the plurality of light sources. This enables a user to commission/configure the light sources by providing the light source description at the location of the light source. The light source description is descriptive of an identifier of a respective light source. The light source descriptions may already be stored in a memory in a lighting control device (e.g. a smartphone, a bridge, a home control system, the controller etc.) and the processor 110, 210 may have access to these area descriptions. A user may, for example, stand nearby a light source (having light source description "kitchen lamp 1") and provide a voice command "this is kitchen lamp 1", whereupon the localization module 108, 208 may determine the user location based on differences between the voice command received at different microphones of the plurality of microphones. After determining the user location and identifying the light source based on the identifier, the processor 110, 210 may determine the location of the light source based on the user location. The processor 110, 210 may further store the light source location in a memory. This is beneficial, because this enables a user, when the controller 102, 202 is no longer set to the learning mode, to control the set of light sources without requiring the area description. For example, the user can simply provide a voice command "turn lights off" when he or she is in the kitchen, without requiring to indicate the area.

The processor 110, 210 may be further configured to identify the user based on the sound input, and to control the one or more light sources further based on a user profile associated with the identified user. The processor 110, 210 may use voice recognition algorithms to identify the user, and/or the user may provide a voice command providing a user identifier (e.g. "this is [user name]"). The processor 110, 210 may be configured to access a database storing the user profile. The user profile may comprise user preferences (e.g. favorite light settings), and the processor may determine how to control the light output of the one or more light sources based on these preferences.

FIG. 1 shows schematically an embodiment of a top view of a system 100 according to the invention for controlling a plurality of light sources (not shown), wherein a plurality of microphones are distributed throughout a space. The system 100 comprises a controller 102, which comprises a receiver 106 configured to receive a sound input 104 from a plurality of microphones M1-M9, the sound input 104 being a user input from a user. The controller 102 further comprises a localization module 108 configured to determine a user location of the user relative to the plurality of microphones M1-M9 based on differences between the sound input received at different microphones of the plurality of microphones M1-M9. The controller 102 further comprises a processor 110 configured to receive location information indicative of locations of the plurality of light sources. The processor 110 is further configured to determine which one or more light sources of the plurality of light sources are associated with the user location based on the location information, and to control the one or more light sources based on the sound input 104.

The processor 110 may be arranged for accessing a memory storing locations of the plurality of microphones M1-M9. The memory may be comprised in the controller, or in a further device such as a home control system, a remote server, a bridge device, etc. The light sources may be located at the microphones M1-M9, or both the light sources and the microphones M1-M9 may be comprised in lighting devices (e.g. luminaires). Alternatively, the light sources may be distributed throughout the space and have locations relative to the space and/or relative to the controller. The processor 110 may be configured to receive the location information indicative of locations of the plurality of light sources and/or the plurality of microphones M1-M9. This location information may be further used to determine the user location of a user relative to the plurality of microphones M1-M9.

In the next example, referring to FIG. 1, the plurality of light sources are co-located with the plurality of microphones M1-M9. The receiver 106 of the controller 102 may receive the sound input 104 recorded by the plurality of microphones M1-M9. The localization module 108 may determine that the user is located close to microphones M1, M2, M4 and M5, because the time of arrival of the sound input 104 at microphones M1, M2, M4 and M5 is earlier than the time of arrival of the sound input 104 at microphones M3, M6, M7, M8 and M9. The processor 110 may be further arranged for accessing a memory storing locations of the plurality of microphones M1-M9 (and therewith the locations of the light sources). Based on this information, the processor 110 may control the light sources located at microphones M1, M2, M4 and M5 according to a light setting based on the sound input (the sound input may, for example, comprise a voice command "dim the light", whereupon the processor 110 may dim the light emitted by light sources located at microphones M1, M2, M4 and M5).

FIG. 2 shows schematically an embodiment of a top view of a system 200 according to the invention for controlling a plurality of light sources 212, 214, 216, 218, wherein a plurality of microphones M1-M6 are comprised in a controller 202. The system 200 comprises the controller 202, which comprises a receiver 206 configured to receive a sound input 204 from a plurality of microphones M1-M6, the sound input 204 being a user input from a user. The controller 202 further comprises a localization module 208 configured to determine a user location of the user relative to the plurality of microphones M1-M6 based on differences between the sound input received at different microphones of the plurality of microphones M1-M6. The controller 202 further comprises a processor 210 configured to receive location information indicative of locations of the plurality of light sources 212, 214, 216, 218. The processor 206 is further configured to determine which one or more light sources of the plurality of light sources 212, 214, 216, 218 are associated with the user location based on the location information, and to control the one or more light sources based on the sound input 204.

The processor 202 is configured to receive the location information indicative of locations of the plurality of light sources 212, 214, 216, 218. The location information may be received from the light sources 212, 214, 216, 218 directly, or from a further device such as a home control system, a remote server, a bridge device, etc. The receiver 206 of the controller 202 may receive the sound input 204 recorded by the plurality of microphones M1-M6. The localization module 208 may determine that the user is located somewhere in the direction of microphone M6 because the sound input 204 will arrive at M6 first, and, for example, subsequently at M1, M5, M2, M4 and M3. The processor 210 may control the light sources 212, 214 based on the sound input 204, because these light sources are located in the direction of microphone M6 (the sound input 204 may, for example, comprise a voice command "turn lights to green", whereupon the processor 210 may control the light sources 212, 214 according to a green light setting). The processor 210 may be further configured to determine a distance between the controller 202 and the sound input 204 (and therewith the user) based on an intensity of the sound input. This enables the processor to determine the user location based on the distance and the direction. Additionally or alternatively, the processor 210 may compare differences between the sound input received at different microphones of the plurality of microphones M1-M6 and use triangulation/trilateration positioning techniques to pinpoint the location of the sound input 204 (and therewith the user location of the user). The processor 210 may control the light sources 212, 214 based on the sound input, because these light sources associated with the user location 204.

The controller 202 may further comprise an orientation sensor 211A (e.g. a gyroscope and/or an accelerometer) for providing an orientation signal indicative of an orientation of the controller 202. If a user would rotate the controller 202, it is desirable that the processor 210 still 'knows' the locations of the light sources 212, 214, 216, 218 relative to the plurality of microphones M1-M6 (and therewith relative to the controller 202). Therefore, processor 210 may be further configured to determine the locations of the plurality of light sources 212, 214, 216, 218 relative to the controller 202 based on the orientation signal.

The controller 202 may further comprise a location sensor 211B for providing a location signal indicative of a location of the controller 202. The location sensor may for example be a receiver that is configured to receive position information (e.g. coordinates) from an (indoor) positioning system. If a user would move the controller 202 to a new location, it is desirable that the processor 210 still 'knows' the locations of the light sources 212, 214, 216, 218 relative to the plurality of microphones M1-M6 (and therewith to the controller 202). Therefore, processor 210 may be further configured to determine the locations of the plurality of light sources 212, 214, 216, 218 relative to the controller 202 based on the location signal.

Figure 3A:
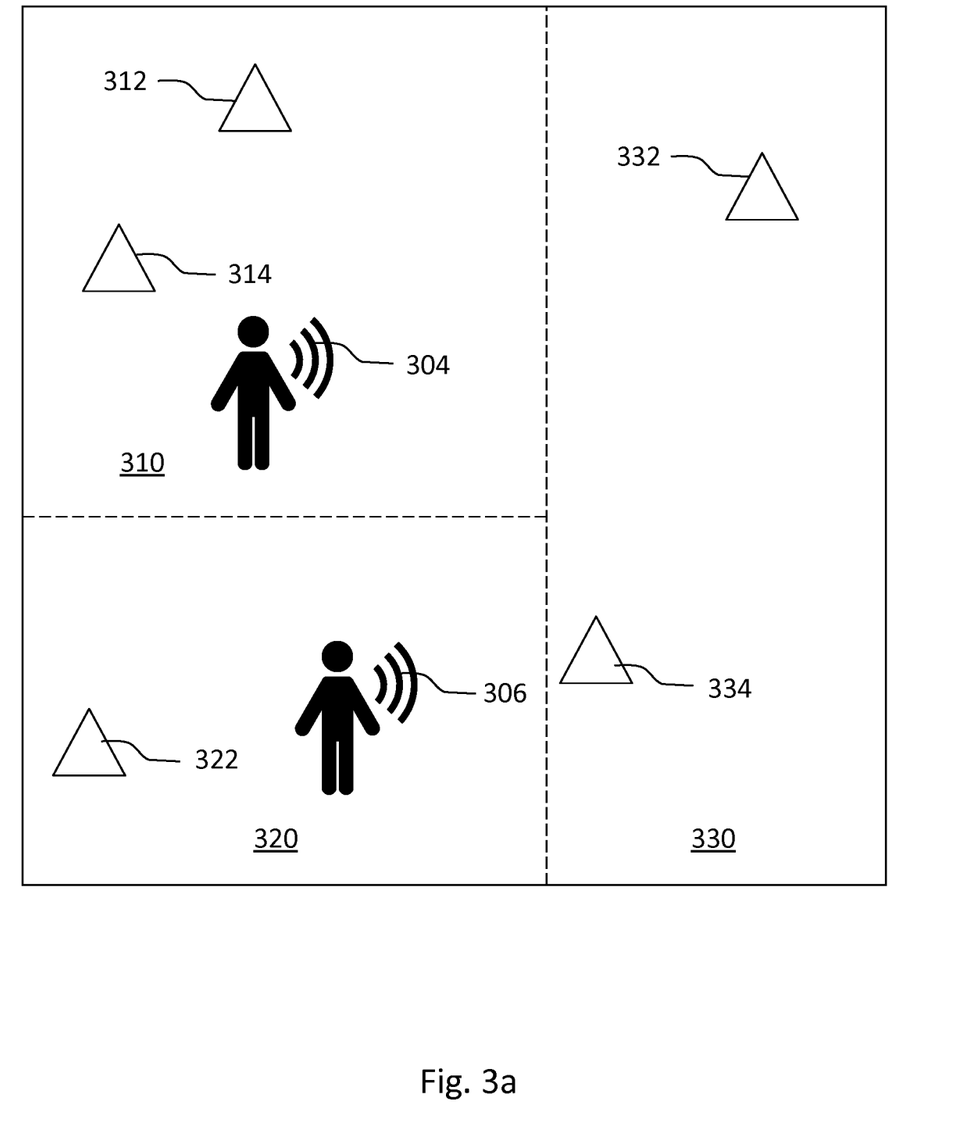
FIGS. 3a and 3b show schematically embodiments of a top view of a system according to the invention for controlling a plurality of light sources, wherein light sources are located in different areas in a space.
Figure 3B:
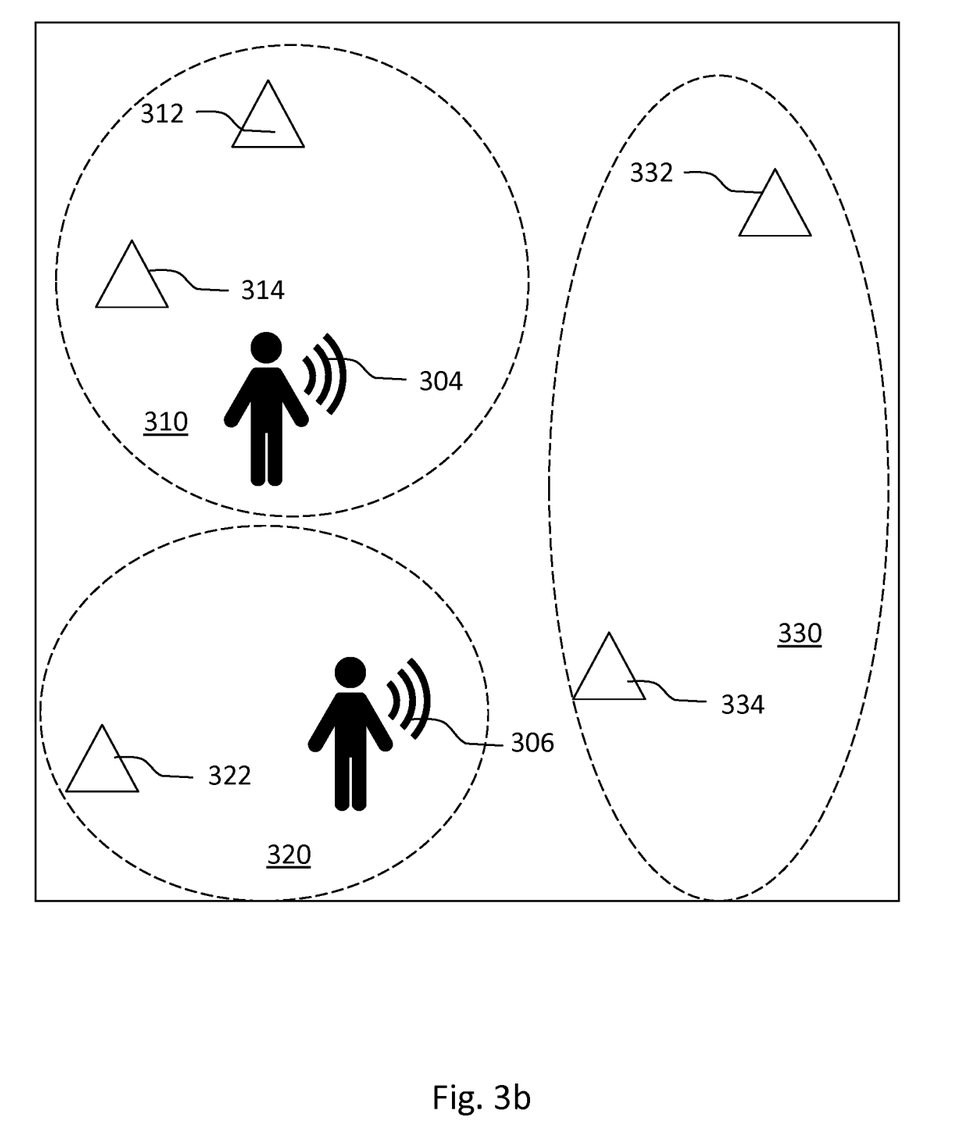

FIGS. 3a and 3b show schematically embodiments of a top view of a system according to the invention for controlling a plurality of light sources 312, 314, 322, 332, 334, wherein the plurality of light sources are distributed over a plurality of areas 310, 320, 330 in a space. The areas may, for example, be rooms in a building (FIG. 3a) or sub-spaces inside a larger area (FIG. 3b). The areas may be defined by coordinates (e.g. sets of X-Y coordinates that define an area, a center coordinate having a radius that determines an area, etc.). The location information may be indicative of in which areas the plurality of light sources are located. The localization module (not shown) may be configured to determine a user area wherein the user is located based on the user location, and the processor (not shown) may be configured to determine which one or more light sources are located in the user area based on the location information and to control one or more light sources located in the user area based on the sound input. For example, in FIG. 3, the localization module (not shown) may determine that a user is located in area 320 based on sound input 306. Even though light source 334 of area 330 is in closer proximity of the user, the processor will control light source 322 according to the sound input 306 because the user is located in area 320. Additionally or alternatively, the localization module may determine that a user is located in area 310 based on sound input 304, resulting in that the processor will control light sources 312 and 314 according to the sound input 304. Since no sound input is detected in area 330, light sources 332 and 334 will remain at their current light setting (e.g. on or off).

Figure 4:
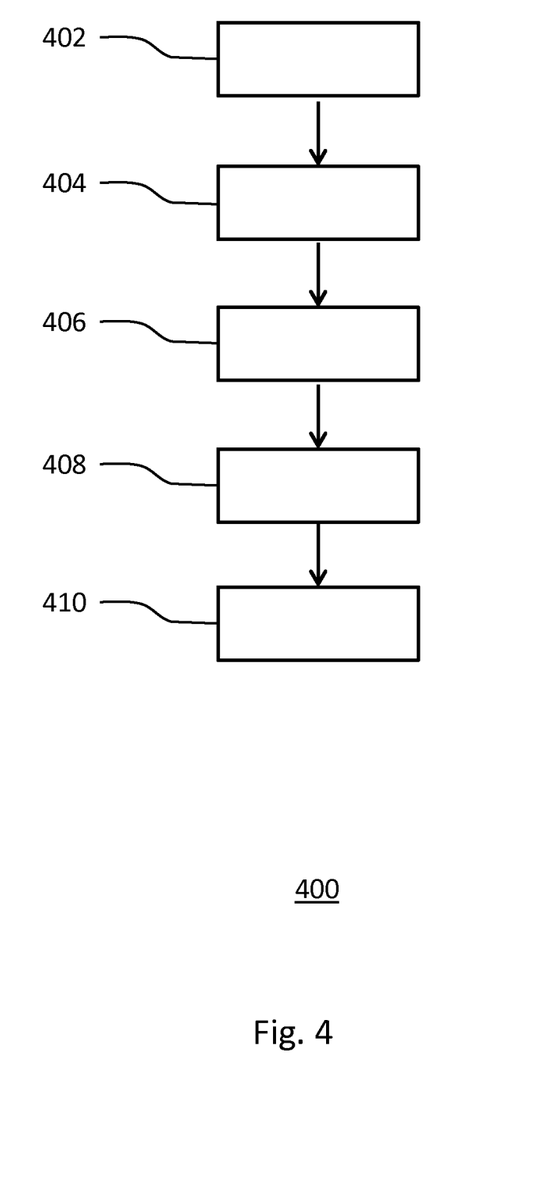
FIG. 4 shows schematically a method according to the invention of controlling a plurality of light sources.

FIG. 4 shows schematically a method 400 according to the invention of controlling a plurality of light sources. The method 400 comprises the steps of:

receiving 402 a sound input from a plurality of microphones, the sound input being a user input from a user, determining 404 a user location of the user relative to the plurality of microphones based on differences between the sound input received at different microphones of a plurality of microphones, receiving 406 location information indicative of locations of the plurality of light sources relative to the controller, determining 408 which one or more light sources of the plurality of light sources are associated with the user location based on the location information, and controlling 410 the one or more light sources based on the sound input.

The method 400 may be executed by computer program code of a computer program product when the computer program product is run on a processing unit of a computing device, such as the processor 110, 210 of the control 102, 202.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A repositionable controller for controlling a plurality of light sources, the repositionable controller comprising:
   a plurality of microphones,
   an orientation and/or a location sensor,
   a receiver configured to receive a sound input from the plurality of microphones, the sound input being a user input from a user,
   a localization module configured to determine a user location of the user relative to the plurality of microphones based on differences between the sound input received at different microphones of the plurality of microphones, and
   a processor configured to receive location information indicative of locations of the plurality of light sources, wherein each of the plurality of light sources is associated with an area description, receive an orientation signal indicative of an orientation of the controller from the orientation sensor and/or a location signal from the location sensor indicative of a location of the controller, determine the locations of the plurality of light sources relative to the controller based on the orientation signal and/or the location signal to account for rotation and/or movement of the repositionable controller, determine which one or more light sources of the plurality of light sources are associated with the user location based on the locations of the plurality of light sources relative to the controller and a comparison of the user location with the area descriptions of the plurality of light sources, and control the one or more light sources of the plurality of light sources based on the sound input.

2. A repositionable controller for controlling a plurality of light sources distributed over a plurality of areas, the repositionable controller comprising:
   a plurality of microphones,
   an orientation sensor and/or a location sensor,
   a receiver configured to receive a sound input from the plurality of microphones, the sound input being a user input from a user,
   a localization module configured to determine a user location of the user relative to the plurality of microphones based on differences between the sound input received at different microphones of the plurality of microphones, and wherein the localization module is configured to determine a user area wherein the user is located based on the user location, and
   a processor configured to receive location information indicative of in which areas of the plurality of areas the plurality of light sources are located, wherein each of the plurality of light sources is associated with an area description descriptive of an area of the plurality of areas, receive an orientation signal indicative of an orientation of the controller from the orientation sensor and/or a location signal from the location sensor indicative of a location of the controller, determine which one or more light sources of the plurality of light sources are located in the user area based on the orientation signal and/or the location signal to account for rotation and/or movement of the controller and a comparison of the user area with the area descriptions of the plurality of light sources, and control the one or more light sources located in the user area based on the sound input.

3. The repositionable controller of claim 2, wherein the sound input is a voice command.

4. The repositionable controller of claim 3, wherein the voice command comprises a target area description of a target area of the plurality of areas, and wherein the processor is further configured to retrieve the target area description from the voice command, and to determine which of the one or more light sources of the plurality of light sources has the area description descriptive of the area of the plurality of areas corresponding to the target area description.

5. The repositionable controller of claim 4, wherein the processor is configured to control, when the processor is unable to retrieve the target area description from the voice command or when the processor has determined that no area description corresponds to the target area description, the one or more light sources of the plurality of light sources located in the user area.

6. The repositionable controller of claim 3, wherein the processor is further configured to activate and deactivate a learning mode of the controller, wherein, when the controller is set to the learning mode, the processor is configured to generate the location information by:
   retrieving a user area description descriptive of the user area from the voice command,
   determining if the one or more light sources are located in the user area by comparing the user area description with the area descriptions of the plurality of light sources, and, if the one or more light sources are located in the user area, determining light source locations of the one or more light sources based on the user location.

7. The repositionable controller of claim 3, wherein the processor is further configured to activate and deactivate a learning mode of the controller, wherein, when the controller is set to the learning mode, the processor is configured to generate the location information by:

retrieving a light source description from the voice command, the light source description being descriptive of an identifier of the one or more light source of the plurality of light sources, identifying the one or more light source based on the identifier, determining a location of the one or more light source based on the user location, and repeating the previous steps for other light sources of the plurality of light sources.

8. The controller of claim 1, wherein the processor is configured to identify the user based on the sound input, and to control the one or more light sources of the plurality of light sources further based on a user profile associated with the identified user.

9. The controller of claim 1, wherein the localization module is configured to determine the user location of the user based on differences in signal strength of the sound input received at the different microphones of the plurality of microphones.

10. The repositionable controller of claim 1, wherein, when first and second light sources of the plurality of light sources are associated with the user location, the processor is configured to control the first and second light sources further based on a distance between a respective light source and the user location.

11. A system for controlling the plurality of light sources, the system comprising:

the repositionable controller of claim 1, and the plurality of light sources, each arranged for receiving a control signal from the controller.

12. A method of controlling a plurality of light sources with a repositionable controller comprising a plurality of microphones and an orientation and/or a location sensor, the method comprising:

receiving a sound input from the plurality of microphones, the sound input being a user input from a user, determining a user location of the user relative to the plurality of microphones based on differences between the sound input received at different microphones of the plurality of microphones, receiving location information indicative of locations of the plurality of light sources relative to the repositionable controller, wherein each of the plurality of light sources is associated with an area description, receiving an orientation signal from the orientation sensor and/or a location signal from the location sensor to account for rotation and/or movement of the repositionable controller, determining the locations of the plurality of light sources relative to the repositionable controller based on the orientation signal and/or the location signal, determining which one or more light sources of the plurality of light sources are associated with the user location based on the locations of the plurality of light sources relative to the repositionable controller and comparing the user location with the area descriptions of the plurality of light sources, and controlling the one or more light sources of the plurality of light sources based on the sound input.

13. A computer program product for a computing device, the computer program product comprising computer program code to perform the method of claim 12 when the computer program product is run on a processing unit of the computing device.

14. The repositionable controller of claim 1, wherein the localization module is configured to determine the user location of the user based on differences in time between receiving the sound input at the different microphones of the plurality of microphones.

15. The method of claim 12, wherein the step of determining the user location of the user relative to the plurality of microphones comprises determining differences in time between receiving the sound input at the different microphones of the plurality of microphones.

* * * * *